United States Patent
Monroe et al.

(10) Patent No.: US 6,427,540 B1
(45) Date of Patent: Aug. 6, 2002

(54) PRESSURE SENSOR SYSTEM AND METHOD OF EXCITATION FOR A PRESSURE SENSOR

(75) Inventors: Tex K. Monroe, Deltona, FL (US); Robert M. Podoloff, Framingham, MA (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/504,546

(22) Filed: Feb. 15, 2000

(51) Int. Cl.⁷ .................................................. G01L 9/00
(52) U.S. Cl. .......................................................... 73/753
(58) Field of Search .......................... 73/756, 862, 473, 73/754; 62/155; 700/9; 307/10.1, 139, 9.1; 338/2, 99, 209; 280/731; 318/807; 340/438, 449

(56) References Cited

U.S. PATENT DOCUMENTS

| | | | |
|---|---|---|---|
| 4,856,993 A | 8/1989 | Maness et al. ................ 433/68 |
| 5,398,962 A | * 3/1995 | Kropp ......................... 280/731 |
| 5,505,072 A | 4/1996 | Oreper ......................... 73/4 R |
| 5,539,259 A | 7/1996 | Filion et al. ................ 307/10.1 |
| 5,541,570 A | 7/1996 | McDowell .................... 338/47 |
| 5,563,354 A | 10/1996 | Kropp ................... 73/862.473 |
| 5,681,997 A | 10/1997 | McHale et al. ................ 73/727 |
| 5,804,978 A | * 9/1998 | Scheerer et al. ............ 324/706 |
| 5,945,802 A | * 8/1999 | Konrad et al. .............. 318/807 |
| 5,965,952 A | * 10/1999 | Podoloff et al. ........... 307/10.1 |

FOREIGN PATENT DOCUMENTS

| | | |
|---|---|---|
| DE | 1957538 | 7/1970 |
| DE | 4201313 | 7/1993 |

* cited by examiner

*Primary Examiner*—William Oen
(74) *Attorney, Agent, or Firm*—Lonnie Drayer; Patrick Stiennon (57) ABSTRACT

An apparatus for detecting a force applied using a pressure sensor, an alternating voltage applied to the pressure sensor, and means for detecting the output voltage from the sensor to determine the force applied. One embodiment applies the alternating voltage using a DC input voltage and a microcontroller for switching the voltage applied to the sensor.

20 Claims, 6 Drawing Sheets

PRESSURE SENSOR SYSTEM AND METHOD OF EXCITATION FOR A PRESSURE SENSOR

TECHNICAL FIELD

The present invention relates to a method of excitation of a pressure sensor to increase the useful life of the sensor. This method of excitation is especially applicable to resistive sensors which are required to operate continuously for very long periods of time, and to sensors where low cost or operational requirements prevent the use of hermetic sealing or other means of protection from humidity and contaminants.

BACKGROUND OF THE INVENTION

The present invention relates to electrical excitation of membrane-style pressure sensors, which are used in a variety of applications including automotive applications for horn activation or occupant weight sensing, and security applications. These sensors typically are constructed of layers of conductive ink and pressure sensitive material that changes resistance when a pressure is applied, printed on an electrical insulator such as a layer of plastic film. These sensors may be of the type as described in U.S. Pat. Nos. 5,398,962 and 5,563,354 to Kropp; and U.S. Pat. No. 5,541,570 to McDowell.

Normally in operation these sensors are supplied with a small DC voltage as an element in a resistive voltage divider or an operational amplifier circuit, and the resulting change of output voltage when force is applied is detected by an A/D converter, voltage comparator, or other detection circuit. The level of voltage sensed is proportional to the force applied.

Kropp describes in U.S. Pat. No. 5,398,962 a horn activator using pressure sensors. The Kropp sensor in effect is a variable resistor, which has an output that varies with the force applied. In Kropp, the resistance of the sensor is calculated using an inverting op-amp circuit. $V_O = V_D \times R_F / R_S$ (where $R_S$ is the sensor resistance; $R_F$ is the reference resistance; $V_O$ is the output voltage; $V_D$ is the driving voltage). However, Kropp describes a negative five direct current voltage being applied to the sensor.

Many of the applications for membrane sensors are subject to environmental conditions of high humidity and temperature extremes. In addition, many applications, such as automotive applications, require the sensor to continue to function for many years without failure while being continuously powered. It has been found that many of these membrane sensors have a limited life due to gradual degradation caused by ionic migration of conductive materials and electrolytic action inside the sensor when DC voltage is applied for a long period of time. This degradation may occur faster in the presence of humidity, which can gradually diffuse into the sensor through the thin substrate and through the adhesive layer which bonds the two substrates. The degradation of the sensor often causes a gradual reduction in the electrical resistance of the sensor. This degradation progresses until the sensor is electrically shorted or is no longer within its useful specifications.

It is desirable to minimize this degradation by providing an electrical excitation to the sensor that minimizes or eliminates the degradation of these sensors.

It is therefore the object of this invention to provide a method of excitation of a resistive sensor that maximizes the sensor's life, allowing use of these inexpensive and flexible sensors for long service life applications. The excitation and sensing circuit must also allow the sensor to continue to perform its function of sensing pressure and be inexpensive so as to maintain the advantage of the low cost membrane sensor technology.

It was found by environmental testing that periodically reversing the excitation voltage polarity to a membrane pressure sensor can allow the sensor to continue to perform hundreds of times longer than an identical sensor which uses a constant direct voltage without polarity reversal.

Methods are shown which periodically reverse the sensor excitation polarity while still detecting a change of sensor resistance caused by application of pressure to the sensor. This method is referred to as Alternating Current (AC) Excitation.

The sensor applications shown are for an automotive horn system but this is simply one example of many uses for these sensors and the AC excitation methods shown here. Other resistive sensor applications include security applications, dental applications, and other automotive applications.

The preferred method of AC excitation described was developed to minimize cost and minimize the changes in hardware and software compared to the current DC excitation methods, while satisfying the sensing requirements.

BRIEF DESCRIPTION OF THE DRAWINGS

Further features of the present invention will become apparent to those skilled in the art to which the present invention relates from reading the accompanying drawings, in which.

DETAILED DESCRIPTION OF THE INVENTION

Figure 1:
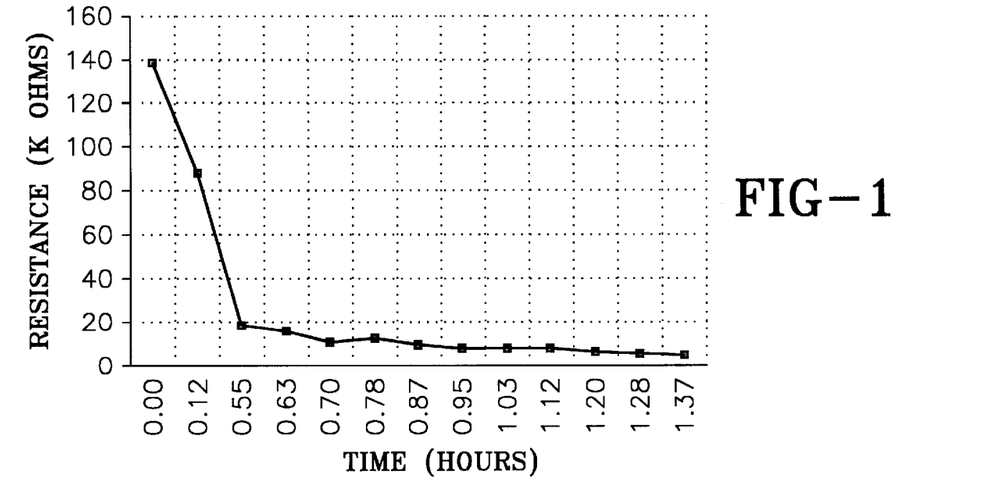
FIG. 1 shows the operational life of a sensor using +5 direct current excitation voltage.
Figure 2:
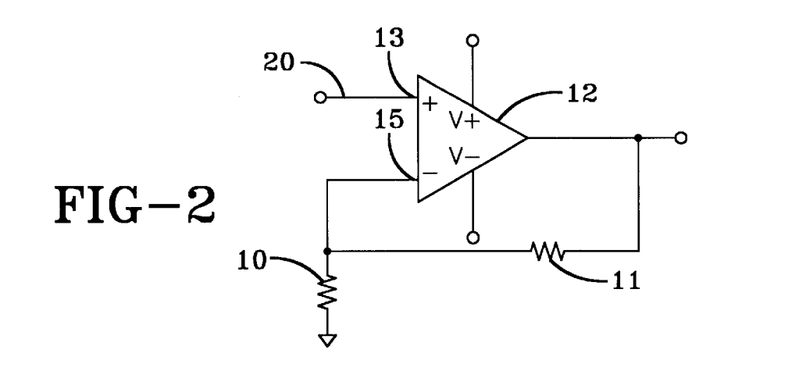
FIG. 2 shows the test circuit used for recording the data for FIG. 1 and FIG. 5.

FIG. 1 shows the operational life when a constant DC voltage is applied to a membrane sensor 10 from a circuit such as that shown in FIG. 2. The sensor tested was a membrane pressure sensor approximately 125 mm ×125 mm in size, manufactured by Force Imaging Technologies, part number 99F32055. The sensor degrades with time until it is electrically shorted or until it has such low resistance that it is no longer useful as a pressure sensor. This degradation was found to occur due to migration of conductive metals such as silver within the sensor, and also due to chemical changes to other materials within the sensor caused by electrolytic processes in the presence of moisture and a DC voltage potential.

In FIG. 2, the input voltage 20 of +5 volts is applied to the sensor 10. The operational amplifier 12 of FIG. 2 provides a constant voltage to sensor 10 via the feedback path through resistor 11. The 5 volt DC bias voltage 20 is applied to the non-inverting op amp positive input 13. A negative feedback path is provided through resistor 11 to the inverting input (−) 15 of the op amp. The output of the op-amp rises until the voltage at the (−) input 15 equals the voltage at the (+) input 13. Current through the resistor 11 and the sensor 10 are equal. Therefore, the resistance of the sensor 10 can be calculated from the output voltage as follows:

$$R_{10}=(V_{20} *R_{11})/(V_{out}-V_{20})$$

Therefore, the voltage across the sensor 10 is always the same as voltage 20 while the operational amplifier is within its normal operating range.

Figure 3:
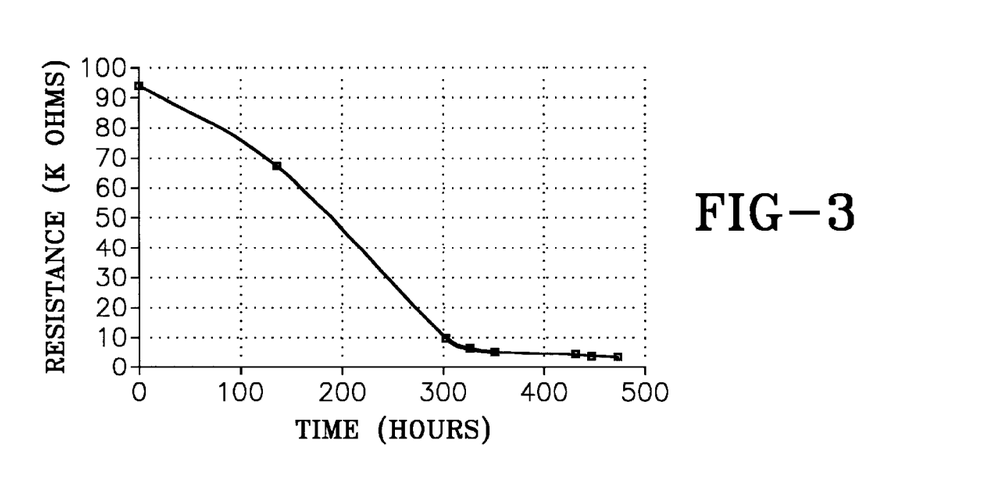
FIG. 3 shows the operational life of a sensor using +5 square wave excitation voltage.

FIGS. 1 and 3 show the difference in operational life of two identical sensors, one using constant 5 volts DC excitation voltage, the other using +5 volts square wave excitation with otherwise identical conditions. For these tests, voltage of 5 volts was used instead of a one-volt excitation for the sensors to accelerate the degradation of the sensors. Conditions for these tests were temperature of 24° C. and humidity of approximately 45%. When comparing the two sensors in FIGS. 1 and 3, the initial resistance in FIG. 1 is 140 K ohms and the initial resistance in FIG. 3 is 94 K ohms. This difference in initial resistance is normal for this type of membrane pressure sensor. Resistance with an identical load may vary substantially. These sensors are used for relative load change measurements, but not as accurate absolute load measurements without calibrating each one separately.

Figure 4:
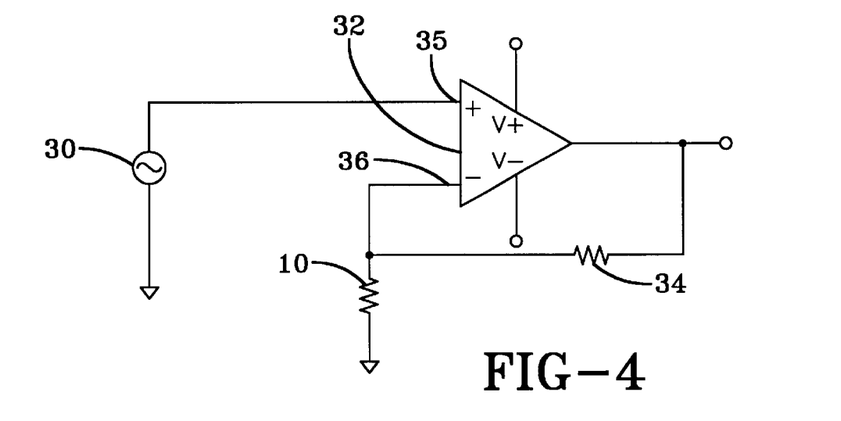
FIG. 4 is the circuit used for recording the data for FIG. 3.

FIG. 3 shows the greatly increased life of an identical sensor when the voltage is periodically reversed. In this case the voltage was reversed at a rate of 500 Hz. For this test of the sensor 10 the circuit of FIG. 4 was used. This circuit requires two voltage supplies at +15 volts, and also an AC drive signal from a signal generator 30 which provides the +5 volt reference signal. The operational amplifier 32 of FIG. 4 provides a constant voltage to the sensor 10 via the feedback path through a resistor 34. The +5 volt AC bias voltage 30 is applied to the non-inverting op amp positive input 35. A negative feedback path is provided through the resistor 34 to the inverting input (−) 36 of the op amp. The output of the op-amp rises or falls until the voltage at the negative input 36 equals the voltage at the positive input 35. Current through the sensor 10 and the signal generator 30 are equal.

Therefore, the resistance of the sensor 10 can be calculated from the output voltage as follows:

$$R_{10}=(V_{30}*R_{34})/(V_{out}-V_{30})$$

The voltage across the sensor 10 is always the same as the voltage of the signal generator 30 while the operational amplifier 32 is within its normal operating range.

Figure 5:
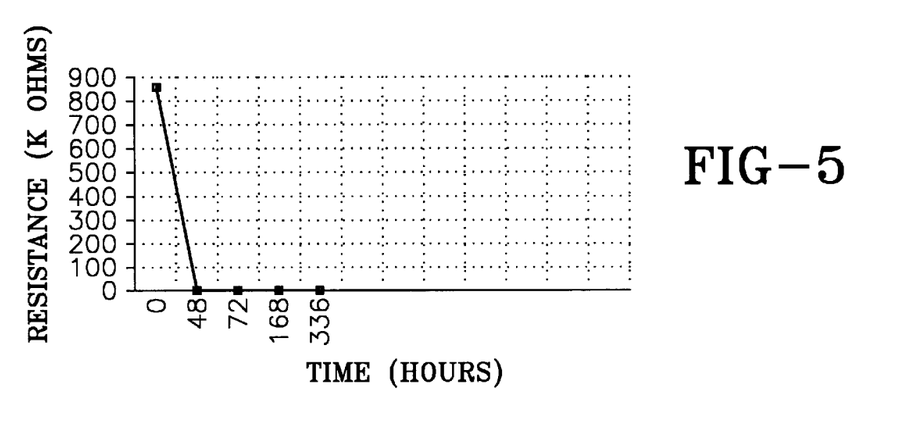
FIG. 5 shows the operational life of a sensor using +1 direct current voltage.
Figure 6:
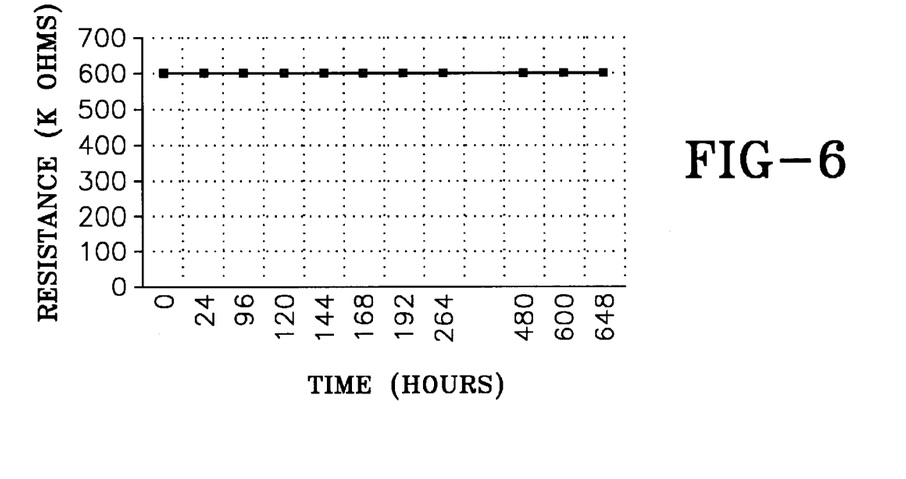
FIG. 6 shows the operational life of a sensor using +1 alternating current voltage.

FIGS. 5 and 6 show the results of tests performed at a 1 volt bias of the sensor with an elevated temperature of 60° C. and at 90% humidity. In FIG. 5 the bias is 1 volt DC and the sensor fails (electrical short) within 48 hours. The circuit shown in FIG. 2 was used with an input voltage of +1 volt to provide the 1 volt DC sensor bias for the test shown in FIG. 5.

Figure 7:
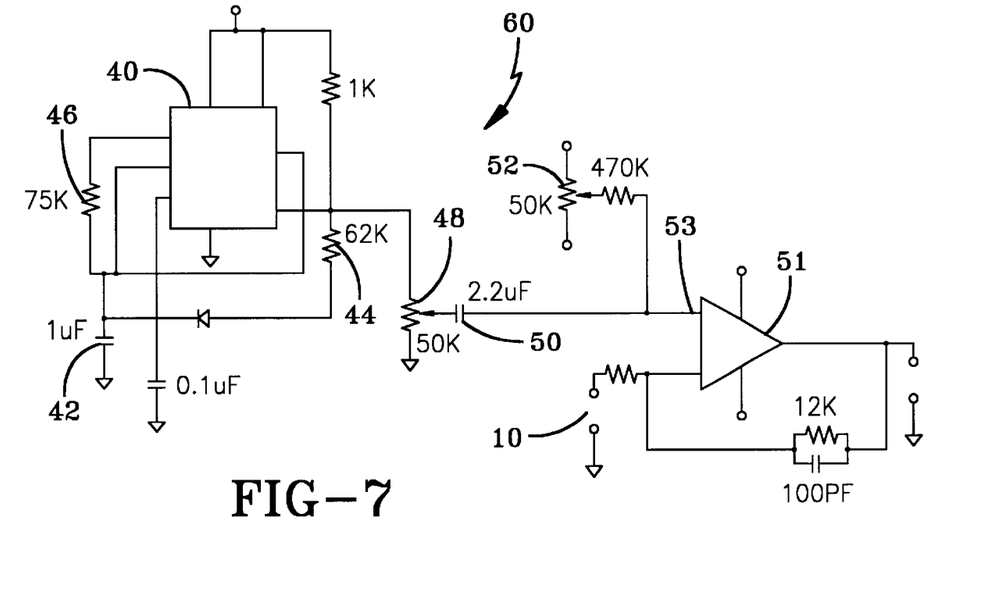
FIG. 7 shows the test circuit used for the measurements shown in FIG. 6.

FIG. 6 uses an identical sensor and environmental conditions with a sensor bias of +1 volt AC, with the reversal rate (frequency) of 10 Hz. The sensor has retained its functionality when the test is terminated at 648 hours. FIG. 7 shows the circuit that was used for the AC bias sensor test shown in FIG. 6. In FIG. 7, a LM1455 timer IC 40 is used to generate a DC referenced square wave at a 10 Hz rate. This circuitry is designed to provide a symmetrical square wave with 50% duty cycle. A capacitor 42 together with a charge resistor 44 and a discharge resistor 46 provide a 10 Hz frequency. The output amplitude is adjusted to +1 volt peak-to-peak with a potentiometer 48. The square wave is converted to ground-referenced AC by coupling through a second capacitor 50. A second potentiometer 52 can perform fine adjust to assure the signal is exactly balanced around 0 volts. This AC signal is then applied to the positive input 53 to the op amp 51 which provides the constant AC voltage source to the sensor 10.

Figure 8:
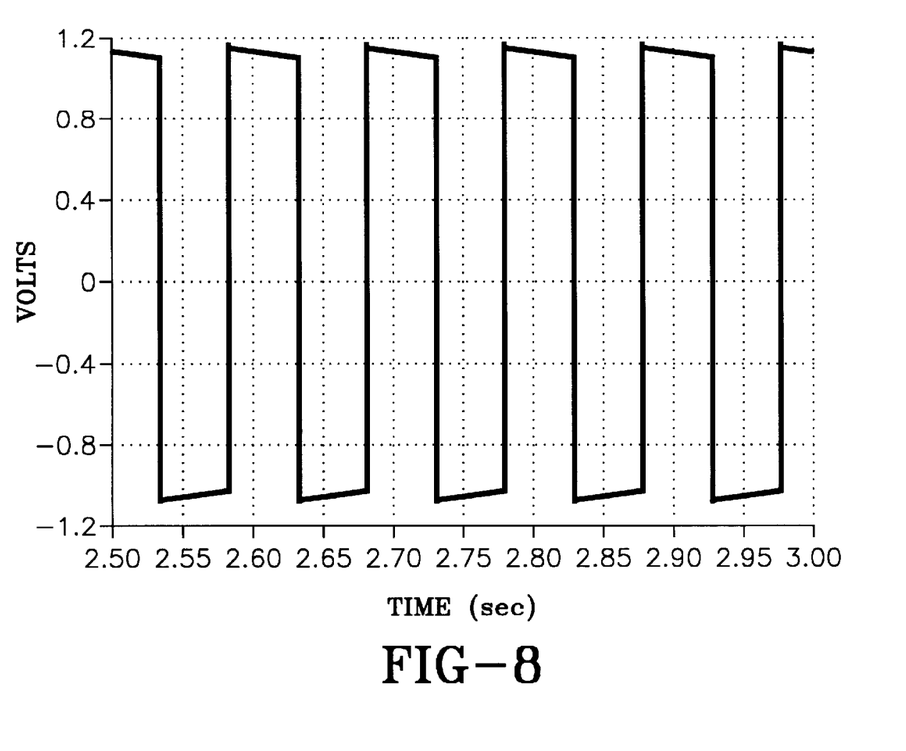
FIG. 8 shows the waveform applied to the sensor using the AC drive from the circuit of FIG. 7.

FIG. 8 shows the 1 volt peak AC bias voltage that is applied to the sensor using the circuit of FIG. 7.

For a practical application of AC excitation such as a vehicle horn, the methods of FIGS. 4 or FIG. 7 are difficult and expensive to implement because both a positive and a negative voltage relative to ground are required. In addition, the reference signal required is AC and the output signal is AC, which is difficult to measure with a typical A/D converter. Thus, the circuit of FIG. 9 was designed.

Figure 9:
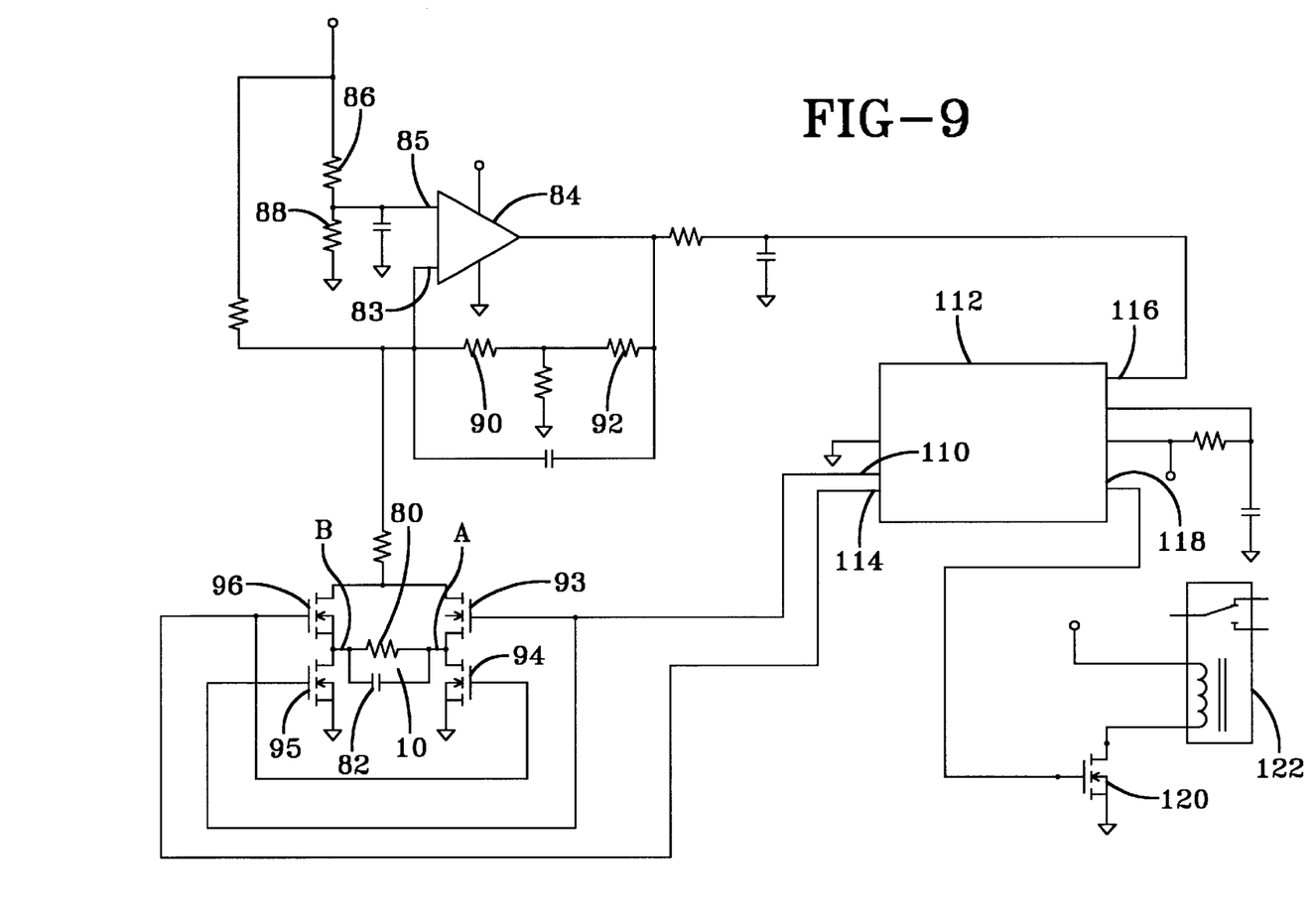
FIG. 9 is a diagram of a preferred embodiment of the AC sensor drive for an automotive horn sensor circuit.

FIG. 9 shows an implementation of AC sensor drive for an automotive horn sensor circuit. The sensor 10 is represented by a resistor 80 and a capacitor 82. In the preferred embodiment, the sensor is constructed of layers of conductive ink and pressure sensitive material that changes resistance when a pressure is applied, printed on an electrical insulator such as a layer of plastic film. The sensor may be of the type as described in U.S. Pat. Nos. 5,563,354; 5,541,579; and 5,398,962. The sensors tested were membrane pressure sensors approximately 125 mm ×125 mm in size, manufactured by Force Imaging Technologies, part number 99F32055. An op-amp 84 is used to provide a constant-voltage DC source at the negative input 83. The positive input 85 is biased at 1 volt DC by a first resistor 86 and a second resistor 88, therefore the negative input 83 is also maintained at 1 volt by negative feedback through third and fourth resistors 90 and 92. In a common circuit using DC sensor bias, the sensor would be connected between the negative input 83 of the op-amp and the ground. However, when first, second, third, and fourth FETs 93, 94, 95, and 96 are added, the ends of the sensor can be periodically reversed. In this circuit, when a first pin 110 of a microcontroller 112 is raised to +5 volts and a second pin 114 is set to ground, the first and third FETs 93 and 95 are turned on while the second and fourth FETs 94 and 96 are turned off, connecting end "A" of the sensor to the op amp (−) input 83 while end "B" is grounded. When the first pin 110 of the microcontroller is set to ground and the second pin 114 is set to +5 volts, the second and fourth FETs 94 and 96 are turned on and the first and third FETs 93 and 95 are turned off. This then reverses the connections to the sensor 10, and end "B" is connected to the (−) input 83 of the op-amp and end "A" is connected to ground.

Figure 11:
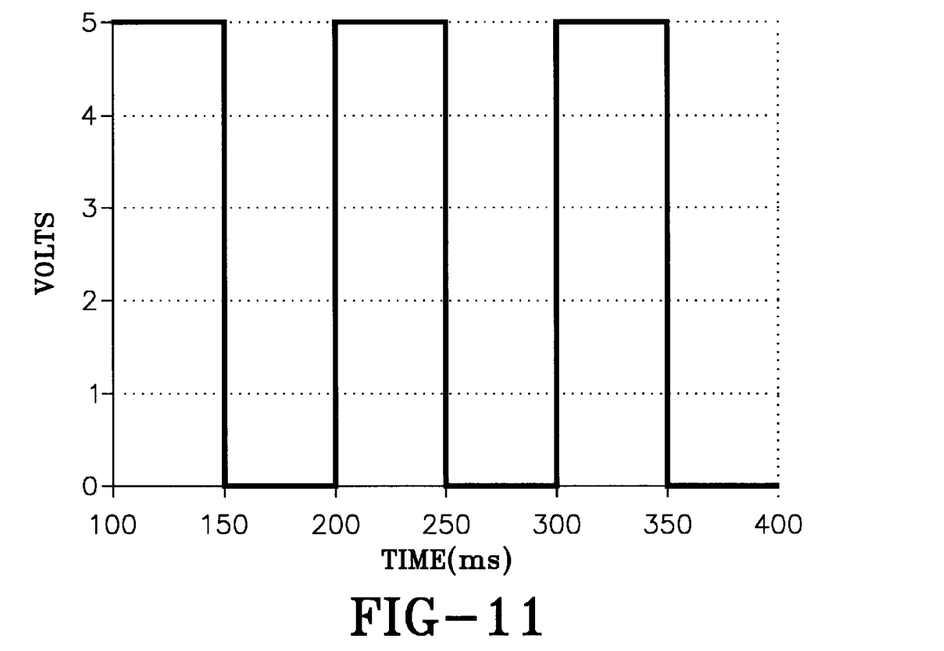
FIGS. 11 and 12 are the 180° out-of-phase drive signals from a microcontroller to drive Field Effect Transistors (FETs) of the circuit of FIG. 9.
Figure 12:
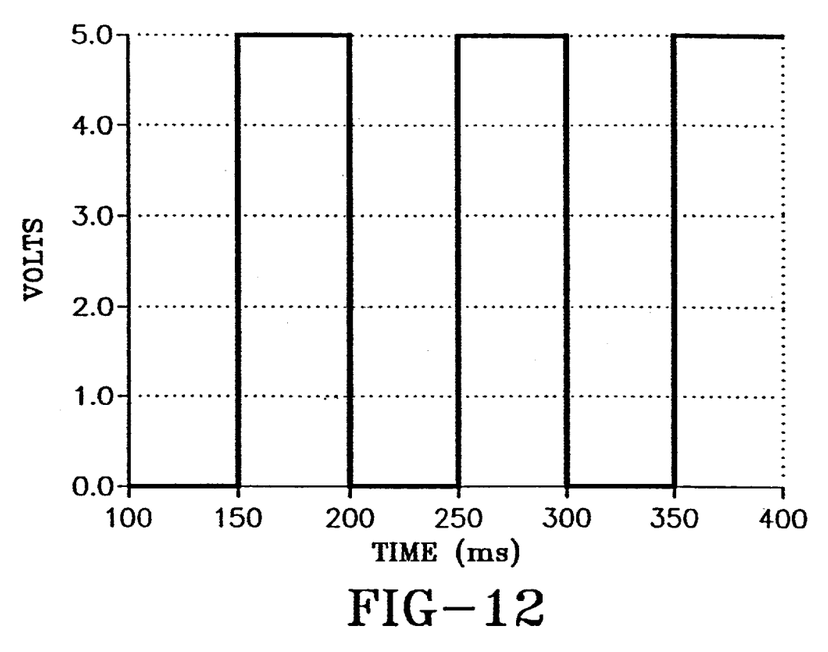

The two port pins 110 and 114 of the microcontroller 112 are controlled by software in the microcontroller, using the internal timer to generate an interrupt that switches the two port pins between 0 and 5 volts periodically. The signals from pins 110 and 114 of the microcontroller are shown in FIG. 11 and FIG. 12 respectively. They are simply square waves with 5 volt amplitudes which are 180° out of phase.

Figure 10:
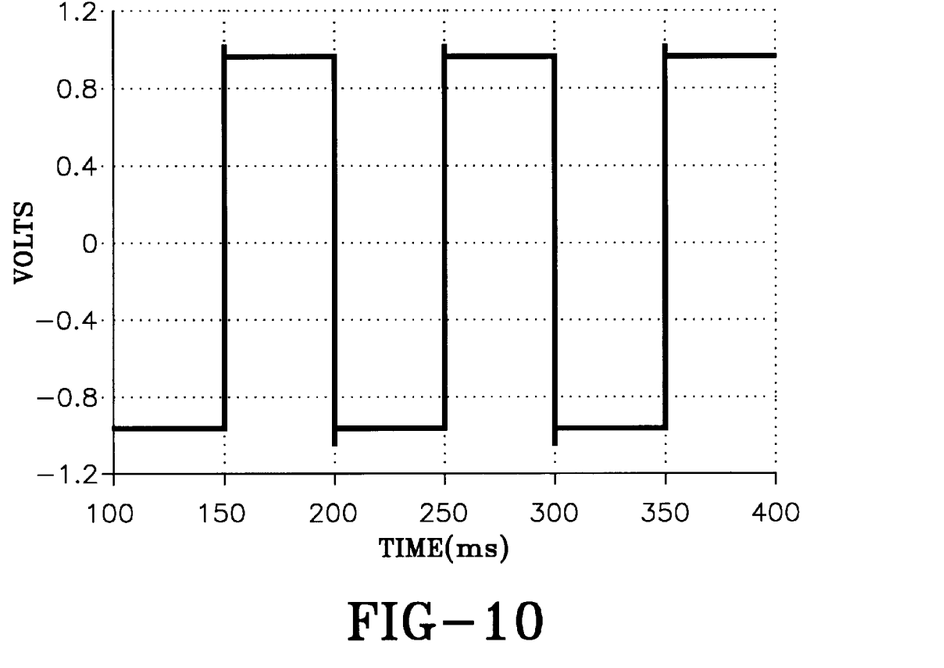
FIG. 10 is the AC voltage applied across the horn sensor of FIG. 9.

The AC voltage applied across the sensor 10 is shown in FIG. 10. In this application the voltage to the sensor 10 is reversed 10 times/second (10 Hz), however other applications could use a slower or faster rate.

Figure 13:
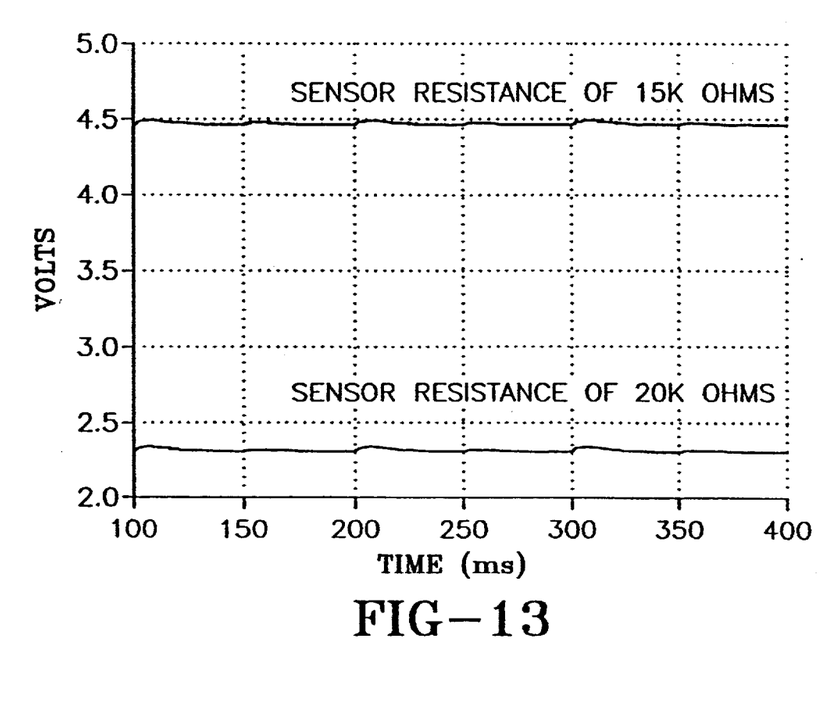
FIG. 13 shows the DC output signal from the operational amplifier (op-amp) of the circuit of FIG. 9 at two different values of sensor resistance.

The output of the op-amp 84 is a DC voltage which is inversely proportional to the resistance of the sensor 10. FIG. 13 shows an example of the output.

The lower trace is the output voltage when the resistance of the sensor is 20 K ohms. The upper trace is the output voltage when the sensor resistance is changed to 15K ohms. The slight ripple on the output voltage is caused by finite switching time of the two port voltages from the microcontroller and the recharging of the capacitor 82 when the voltage is reversed. However this ripple voltage is very small relative to the change in voltage caused by sensor resistance changes so it causes no problem detecting useful changes in the sensor resistance.

Note the circuit of FIG. 9 is simplified, the microcontroller can also be connected to the op-amp circuit to control the gain and/or to compensate the op-amp for widely varying sensor resistance. Also a thermistor can be added to one of the unused A/D converter inputs of the microcontroller to provide temperature compensation.

The output voltage of the op amp can be connected to the analog-to-digital converter input 116 of the microcontroller 112 as shown in FIG. 9. Then the software can calculate the resistance of the sensor using the output voltage and known circuit parameters to determine the sensor environment, in this case the applied force. During operation of this embodiment, when a force is applied to the sensor 10, the resistance of the sensor 10 changes. When the voltage at the A/D input 116 reaches a specified threshold value indicating a predetermined change in resistance of the sensor 10, the output port 118 of the microcontroller 112 is raised to 5 volts. This increase of voltage at the output port 118 turns on a metal oxide semiconductor field effect transistor (MOSFET) 120 and activates a horn relay 122.

FIG. 11 and FIG. 12 show the 180° out-of-phase drive signals from the microcontroller necessary to drive the FETs 93, 94, 95, and 96 of the circuit of FIG. 9 which produce the AC sensor drive. FIG. 13 shows the DC output signal from the circuit that is applied to the A/D converter of Microcontroller 112. The lower trace is the signal when the sensor resistance is 20K ohms, the upper trace is the signal when mechanical force is applied to the sensor and its resistance changes to 15K ohms.

It is to be understood that while the preferred embodiments of the present invention have been described, various changes and modifications may be made by those skilled in the art without departing from the scope of the invention as set forth in the claims.

What is claimed:

1. A pressure operated switch comprising:
   a membrane pressure sensor, which is a variable resistor which varies in response to pressure, the variable resistor having a first end, and a second end:
   an operational amplifier having a positive input, a negative input, and a DC voltage output, the output being connected to the negative input and the output being connected to ground through the membrane pressure sensor;
   a microcontroller incorporating a timer and a voltage monitoring circuit;
   a plurality of switches, arranged to in a first condition, connect the first end of the membrane pressure sensor to the negative input of the operational amplifier, and the second end to ground, and alternatively to, in a second condition, connect the first end to ground and the second end to the negative input of the operational amplifier, wherein the plurality of switches are connected to the microcontroller, and the microcontroller, in response to the timer, periodically alternates the plurality of switches between the first condition and the second condition;
   the voltage monitoring circuit of the microcontroller being connected to the DC voltage output of the operational amplifier, the microcontroller causing at least one switch to close in response to a change in the voltage of the operational amplifier output; and
   wherein degradation of the membrane pressure sensor is substantially prevented by periodically reversing the flow of current through the membrane pressure sensor, and wherein a change in resistance of the membrane pressure sensor is detected by a change in the DC voltage output of the operational amplifier.

2. The pressure operated switch of claim 1 wherein the microcontroller uses the timer to generate an interrupt that switches a voltage level between two pins, and wherein each pin is connected to a pair of transistors, so that when the voltage level is switched between the two pins, the flow of current through the membrane pressure sensor is reversed.

3. The pressure operated switch of claim 1 wherein the voltage monitoring circuit of the microcontroller is an A/D converter, and software within the microcontroller calculates a change in resistance for the membrane pressure sensor based on the voltage of the operational amplifier output.

4. The pressure operated switch of claim 1, further comprising:
   a relay; and
   a horn connected to the relay, the relay being controlled by the at least one switch, so that pressure applied to the membrane switch causes the operation of the horn.

5. The pressure operated switch of claim 1 wherein the microcontroller selects a voltage at which the at least one switch is operated based on environmental factors.

6. The pressure operated switch of claim 1 wherein the at least one switch is a metal oxide semiconductor field effect transistor, which is connected to an output port of the microcontroller, which is activated in response to an increase of voltage at the output port of the operational amplifier.

7. The pressure operated switch of claim 1 wherein the current flow through the membrane pressure sensor is reversed at a frequency of 10 Hz.

8. The pressure operated switch of claim 1 wherein the membrane pressure sensor comprises layers of conductive ink and pressure sensitive material that change resistance with an applied force.

9. A pressure operated switch comprising:
   a pressure sensor, having a first end and a second end, the sensor constructed of layers of conductive ink subject to degradation in the presence of a constant applied electrical voltage;
   an op-amp having a positive input, a negative input and a DC output, the DC output being connected to the negative input to provide a selected constant-voltage DC current source at the negative input;
   first, second, third, and fourth transistor means arranged to enable a periodic reversal of the connection of the first end and the second end of the sensor to the constant-voltage D.C. current source at the negative input of the op-amp, and simultaneously to reverse the connection of the second end and the first end of tile sensor to ground;

a timer operatively connected to said first, second, third and fourth transistor means to cause the periodic reversal; and the op-amp providing an output DC voltage which is inversely proportional to the resistance of the sensor and connected to a voltage monitoring circuit.

10. The pressure operated switch of claim 9 wherein the timer is incorporated in a microcontroller, the microcontroller having an A/D converter connected to the output voltage of the op amp, and software running on the microcontroller for calculating the resistance of the sensor using the DC output voltage, the software causing the operation of a first switch in response to a selected change in calculated resistance of the sensor.

11. The pressure operated switch of claim 10 wherein the microcontroller uses the timer to generate an interrupt that switches a voltage level between two pins, and wherein each pin is connected to at least two of said first, second, third, and fourth transistor means so that when the voltage level is switched between the two pins, the flow of current through the membrane pressure sensor is reversed.

12. The pressure operated switch of claim 10, further comprising:

a relay; and a horn connected to the relay, the relay being controlled by the first switch, so that pressure applied to the pressure sensor causes the operation of the horn.

13. The pressure operated switch of claim 10 wherein the microcontroller selects a voltage at which the switch is operated based on environmental factors.

14. The pressure operated switch of claim 10 wherein the switch is a metal oxide semiconductor field effect transistor, which is connected to an output port of the microcontroller, which is activated in response to an increase of voltage at the output port of the operational amplifier.

15. The pressure operated switch of claim 9 wherein the current flow through the membrane pressure sensor is reversed at a frequency of 10 Hz.

16. A method for increasing the life of a membrane type pressure operated switch, comprising the steps of:

constructing a DC constant voltage source by connecting a DC output on an operational amplifier to the negative input of the operational amplifier;

connecting a membrane type pressure operated switch in a first condition between the constant voltage source at the negative input of the operational amplifier and ground, so that current flows through the membrane type pressure operated switch in a first direction, and periodically alternating, by means of switches, the connection of the membrane type pressure operated switch between the first condition, and a second condition in which the membrane type pressure operated switch is connected between the constant voltage source of the negative input of the operational amplifier and ground so the current flows through the membrane type pressure operated switch in a direction opposite the first direction, so that current flow through the membrane type pressure operated switch averages to substantially zero;

monitoring the voltage of the DC output of the operational amplifier to detect change in voltage produced by a change in resistance of the membrane type pressure operated switch, and, in response to a selected voltage change, operating a switch.

17. The method of claim 16 wherein a microcontroller is employed to cause the current flow in the membrane type pressure operated switch to periodically reverse.

18. The method of claim 17 wherein the voltage of the DC output of the operational amplifier is monitored with an A/D converter, and software within the microcontroller calculates a change in resistance for the membrane pressure sensor based on the voltage of the operational amplifier output, and the software causes the microcontroller to operate the switch.

19. The method of claim 17, wherein the switch operates a relay which in turn operates a horn.

20. The method of claim 16 wherein the current flow through the membrane pressure sensor is reversed at a frequency of 10 Hz.

* * * * *